(12) United States Patent (10) Patent No.: US 8,851,818 B2
Ogawa (45) Date of Patent: Oct. 7, 2014

(54) AUTOMATIC WAREHOUSE AND CONTROL METHOD THEREOF

(75) Inventor: Kazuhiko Ogawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 707 days.

(21) Appl. No.: 13/177,630

(22) Filed: Jul. 7, 2011

(65) Prior Publication Data

US 2012/0009047 A1 Jan. 12, 2012

(30) Foreign Application Priority Data

Jul. 8, 2010 (JP) ................................. 2010-156201

(51) Int. Cl.
*B65G 1/00* (2006.01)
*B65G 1/06* (2006.01)

(52) U.S. Cl.
CPC ..................................... *B65G 1/065* (2013.01)
USPC ........... 414/267; 414/273; 414/279; 414/281; 414/282; 414/284

(58) Field of Classification Search
CPC ...... B65G 1/065; B65G 1/0492; B65G 1/026; B65G 1/0421
USPC ................... 414/267, 273, 279, 282, 281, 284
See application file for complete search history.

(56) References Cited

U.S. PATENT DOCUMENTS

| 3,417,879 | A | * | 12/1968 | Gough | 414/281 |
| 3,557,973 | A | * | 1/1971 | Bussienne et al. | 414/279 |
| 4,887,953 | A | * | 12/1989 | Greub | 414/331.01 |
| 8,694,152 | B2 | * | 4/2014 | Cyrulik et al. | 700/214 |
| 2002/0021954 | A1 | * | 2/2002 | Winkler | 414/273 |
| 2010/0322746 | A1 | * | 12/2010 | Lert et al. | 414/273 |
| 2010/0322747 | A1 | * | 12/2010 | Lert et al. | 414/273 |
| 2011/0008137 | A1 | * | 1/2011 | Yamashita | 414/267 |
| 2011/0262253 | A1 | * | 10/2011 | Krizmanic et al. | 414/279 |

FOREIGN PATENT DOCUMENTS

| JP | 57-137204 A | 8/1982 |
| JP | 59-097904 A | 6/1984 |
| JP | 03-267203 A | 11/1991 |
| JP | 05-069906 A | 3/1993 |
| JP | 11-278607 A | 10/1999 |
| JP | 2006-256815 A | 9/2006 |

OTHER PUBLICATIONS

Official Communication issued in corresponding Japanese Patent Application No. 2010-156201, mailed on Jun. 12, 2012.

* cited by examiner

*Primary Examiner* — Kaitlin Joerger
(74) *Attorney, Agent, or Firm* — Keating & Bennett, LLP

(57) ABSTRACT

An automatic warehouse includes a rack including vertically arranged shelves and traveling vehicles each of which is provided to a corresponding one of the shelves. The automatic warehouse includes stations receiving an article to be stored on and an article unloaded from the rack, elevators each mediating traffic of articles between the corresponding station and at least one of the traveling vehicles, and a shelf assigning unit assigning, to each of the stations, one or more of the shelves to which the station has priority of use over the rest of the stations.

5 Claims, 12 Drawing Sheets

AUTOMATIC WAREHOUSE AND CONTROL METHOD THEREOF

The disclosure of Japanese Patent Application No. 2010-156201 filed on Jul. 8, 2010 including specification, drawings and claims is incorporated herein by reference in its entirety.

BACKGROUND OF THE INVENTION

1. Field of the Invention

The present invention relates to automatic warehouses including (i) a rack including vertically arranged shelves, each of the shelves including trays horizontally arranged, and (ii) traveling vehicles each of which is provided to a corresponding one of the shelves, and independently travels in a horizontal direction.

2. Description of the Related Art

Some conventional automatic warehouses include a rack having shelves vertically arranged, and traveling vehicles to convey articles from and to the rack. Here each of the shelves has a row of trays horizontally arranged.

The operation of such automatic warehouses requires efficiency in time and space. A technique has disclosed traveling vehicles used for efficient storage and retrieval of articles (See, for example, Japanese Unexamined Patent Application Publication No. 11-278607).

The technique disclosed in Japanese Unexamined Patent Application Publication No. 11-278607 shows that each of the traveling vehicles horizontally travels along one of the shelves, and has an elevating platform equipped with a transfer device. In addition to loading and unloading of articles to and from the shelf, the traveling vehicle can load and unload the articles to and from a shelf located one level or two levels lower than the original shelf.

Here there is an automatic warehouse built for an effective use of storage space and efficient storage and retrieval operations in the automatic warehouse. The automatic warehouse has stations each provided to a different position at one rack. Each station independently stores and retrieves the articles.

In such an automatic warehouse, for example, each station handles a different amount of articles (storage and retrieval amount) to be placed on and taken out of the racks. Thus, the point is how the storage space in the automatic warehouse is assigned to each station. Specifically, it is important to figure out how trays of the rack should be assigned.

FIG. 12 exemplifies a technique to assign trays of a rack to two stations in a conventional automatic warehouse.

A conventional automatic warehouse 500 shown in FIG. 12 includes the following: a rack 500 having shelves 555 vertically arranged, two stations (a first station 512 and a second station 522) for storage and retrieval, and two stacker cranes (a first stacker crane 510 and a second stacker crane 520).

Specifically, in FIG. 12, the far left and the far right of the rack 550 respectively represent the home position and the opposite home position. Here the first station 512 and the second station 522 are respectively provided at the home position and the opposite home position.

The first stacker crane 510 can transport an article, which is brought to the first station 512 from outside, to one of the trays on the rack 550. The first stacker crane 510 can also unload an article from one of the trays on the rack 550, and transport the article to the first station 512.

Similarly, the second stacker crane 520 can (i) transport an article from the second station 522 to the rack 550, and (ii) unload an article from the rack 550 and transport the article to the second station 522.

The first stacker crane 510 and the second stacker crane 520 travel on the same lane horizontally running in front of the rack 550. Thus, the first stacker crane 510 and the second stacker crane 520 cannot overtake each other.

Under such restrictions, assume for example the case where the storage and retrieval amount that the second station 522 handles is greater than that the first station 512 does. Here, FIG. 12 shows the following: a group of tray columns 570, including tray columns of the rack 550 from the opposite home position to the fifth column, is assigned as tray columns used for the second station 522, and a group of tray column 560, including the rest of the three tray columns, is assigned as tray columns used for the first station 512.

Regarding the two stations for the storage and retrieval of the articles, the technique involves determining how the tray columns are assigned to each station so that one of the two stations, handling a greater storage and retrieval amount, has more trays assigned to it.

It is noted that the assigning is carried out by, for example, a controller controlling operations of the automatic warehouse 500.

Thanks to such assigning, the automatic warehouse 500 can make sure to store and retrieve the articles to be stored and retrieved via each of the first station 512 and the second station 522. Furthermore, the first stacker crane 510 and the second stacker crane 520 can technically store and retrieve the articles, freeing each from interference from the other.

Unfortunately, the conventional technique has a problem. That is, as one of the two storage and retrieval stations handles more storage and retrieval amount than the other, the stacker crane for the station handling more storage and retrieval amount has to travel a greater distance.

In other words, one of the stacker cranes has to travel a greater distance as the difference becomes greater in storage and retrieval amount between the two storage and retrieval stations. Thus, the station which has to handle more storage and retrieval amount suffers a decrease in storage and retrieval amount of articles per unit time. The resulting problem is a decrease in capability of the overall automatic warehouse for storage and retrieval.

SUMMARY OF THE INVENTION

In view of the above problems, preferred embodiments of the present invention provide automatic warehouses including stations for storage and retrieval of articles, and capable of efficient operations for storage and retrieval of articles via each of the stations.

An automatic warehouse according to a preferred embodiment of the present invention includes (a) a rack including shelves each including trays, and (b) traveling vehicles each of which is provided to a corresponding one of the shelves, and independently travels in a horizontal direction to load and unload articles to and from the rack, the shelves being vertically arranged, the trays being horizontally arranged. The automatic warehouse includes: stations which are horizontally spaced with each other, and receive an article to be stored on and an article unloaded from the rack; elevators each of which elevates the articles, belongs to a corresponding one of the stations, and mediates traffic of articles between the corresponding station and at least one of the traveling vehicles; and a shelf assigning unit which assigns, to each of the stations, one or more of the shelves to which the station has priority of use over the rest of the stations.

Each station preferably has the trays assigned for a shelf. The trays assigned to one station are used prior to other stations as destinations and sources of the articles.

In other words, each of the traveling vehicles has the same maximum traveling distance in horizontal directions no matter to which station the shelf for the traveling vehicle is assigned. Put another way, the increase in the number of the shelves assigned to one station does not cause the decrease in efficiency of the storage and decrease via the station.

Furthermore, when a traveling vehicle A for a shelf a sequentially place articles, for example, the traveling vehicle A places the articles on trays, beginning at the closest tray to a station L with the shelf a assigned. Hence the traveling vehicle A can place the articles on all the trays found on the shelf a. Thus, the automatic warehouse can be efficiently operated.

Moreover, while the traveling vehicle A is loading and unloading the articles on and from the shelf a, for example a traveling vehicle B for another shelf b can load and unload articles on and from any given tray found on a shelf b.

Thus, even though an article from a station M needs to be placed on the shelf b assigned to the station L having priority use of the shelf b, the traveling vehicle B can travel for the station M, pick up the article, and place the article to a vacant tray found on the shelf b no matter where the other traveling vehicles are positioned.

In the automatic warehouse according to another preferred embodiment of the present invention, when assigning some of the shelves to any one of the stations, the shelf assigning unit may to assign the some shelves which are vertically consecutive.

According to the structure, a station has shelves vertically and consecutively assigned. Thus, the automatic warehouse can efficiently carry out the storage and retrieval operations of the articles for the shelves via the station.

In the automatic warehouse according to another preferred embodiment of the present invention, each of the stations may be placed at a vertically different position, and, when assigning the some selves to any one of the stations, the shelf assigning unit may assign the some shelves so that a vertical position of any one of the some shelves corresponds to a vertical position of the one of the stations.

According to this structure, when two or more of the shelves are assigned to a station, the shelves to be assigned are positioned corresponding to the level of the station. Thus, the total traveling distance of an elevator for the station is successfully minimized.

In the automatic warehouse according to another preferred embodiment of the present invention, the stations may include a first station and a second station, the first station may be placed at a vertical position corresponding to a vertical position of a bottom shelf among the shelves, the second station may be placed at a vertical position corresponding to a vertical position of a top shelf among the shelves, and the shelf assigning unit may (a) assign, to the first station, vertically consecutive shelves including the bottom shelf, and (b) assign, to the second station, vertically consecutive shelves including the top shelf.

According to the structure, each of the first station and the second station of the stations has consecutive shelves assigned. The assigned consecutive shelves are positioned, corresponding to the level of each of the stations. This makes possible efficiently operating the elevator provided to each station.

In the automatic warehouse according to another preferred embodiment of the present invention, the stations may include the first station and the second station, the shelves may be classified into a top-shelf section, a middle-shelf section, and a bottom-shelf section, beginning at a top, one or more of the shelves which belong to the bottom-shelf section may be assigned to the first station, and an other one or more of the shelves which belong to the top-shelf section may be assigned to the second station, and the shelf assigning unit may (a) obtain storage and retrieval amount information indicating a storage and retrieval amount showing an amount of articles transported in and out of the rack via each of the first station and the second station, and (b) assign the one or more of the shelves, which belong to the middle-shelf section, to one of the first station and the second station handling a greater storage and retrieval amount.

According to the structure, the shelf assigning unit determines how to adaptively assign shelves to any given station only on one or more of the shelves which belong to the middle-shelf section. In other words, the shelf assigning unit can efficiently assign the shelves.

Moreover, the bottom-shelf section and the top-shelf section can be dedicated to the first station and the second station, respectively. Hence, for example, the shape and structure of the shelves for the bottom-shelf section and the top-shelf section can be optimized to suit the kinds and weights of the articles which each station handles.

In the automatic warehouse according to another preferred embodiment of the present invention, the shelf assigning unit may (a) obtain storage and retrieval amount information indicating a storage and retrieval amount showing an amount of articles transported in and out of the rack via each of at least two of the stations, and (b) assign one or more of the shelves to each of the two stations so that one of the two stations handling a greater storage and retrieval amount has more shelves assigned than the other station.

According to the structure, at least each of the two of the stations has consecutive shelves assigned. The consecutive shelves to be assigned to each of the stations are found at the level of each station. This makes it possible to efficiently operate the elevator provided to each station.

A method for controlling an automatic warehouse according to another preferred embodiment of the present invention includes: selecting, to each of the stations, one or more of the shelves to which the station has priority of use over the rest of the stations; assigning, to each of the stations, the one or more of the shelves selected in the step of selecting; transporting an article to one of the trays which are included in the one or more of the shelves assigned in the step of assigning, using one of the traveling vehicles corresponding to the one of the trays, the article being received by any one of the stations and to be placed on the rack; and receiving, by any one of the stations, an article transported by the one of the traveling vehicles corresponding to one of the trays, the article being transported from the one of the trays, and the trays being included in the one or more shelves assigned in the assigning.

Various preferred embodiments of the present invention successfully provide automatic warehouses including stations for storage and retrieval of articles, and capable of efficient operations for storage and retrieval of articles via each of the stations.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Described hereinafter is an automatic warehouse according to preferred embodiments of the present invention with reference to the drawings.

Figure 1:
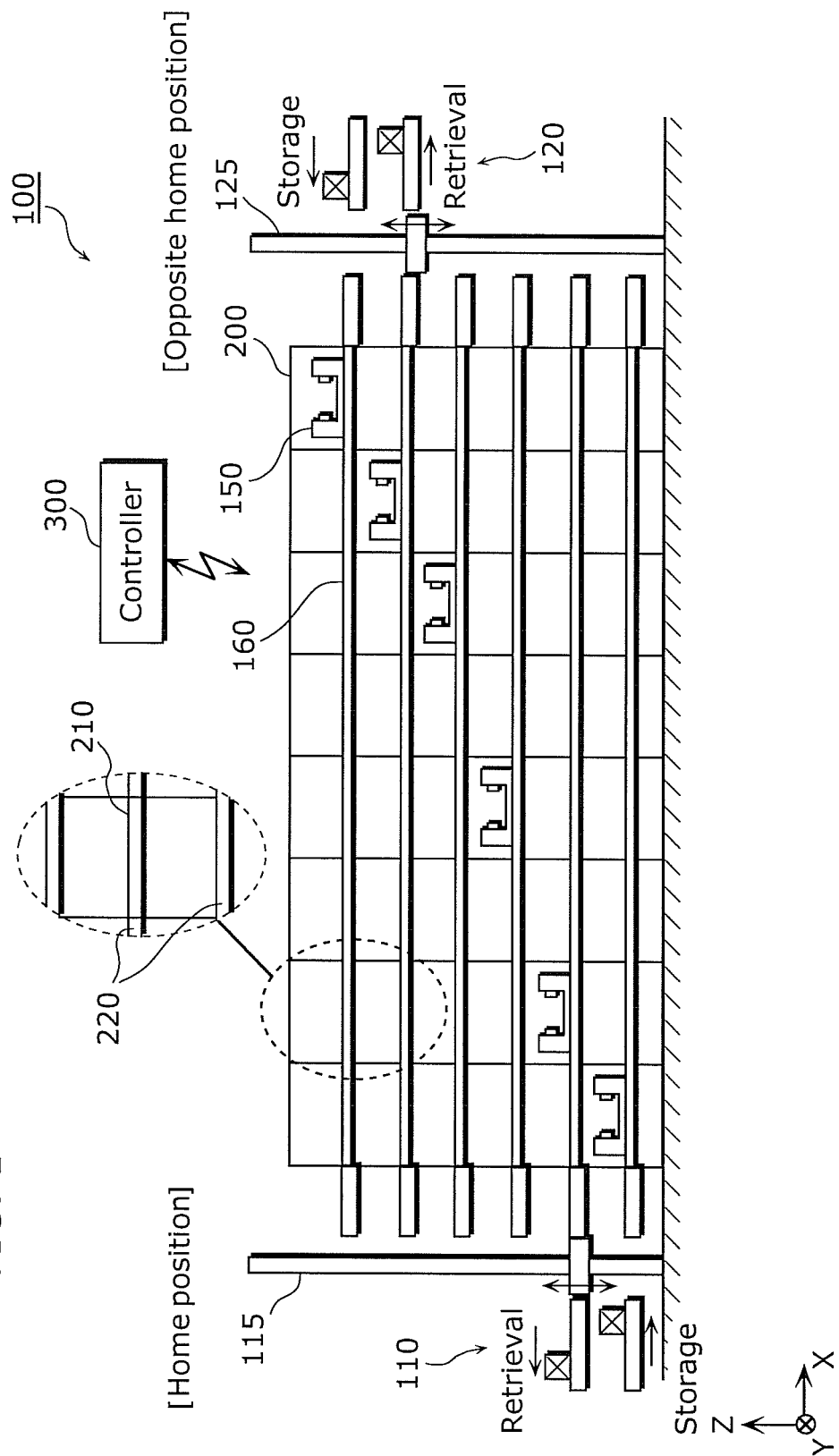
FIG. 1 is an elevation view showing a schematic structure of an automatic warehouse according to a preferred embodiment of the present invention.

FIG. 1 is an elevation view showing a schematic structure of an automatic warehouse according to a preferred embodiment of the present invention.

Figure 2:
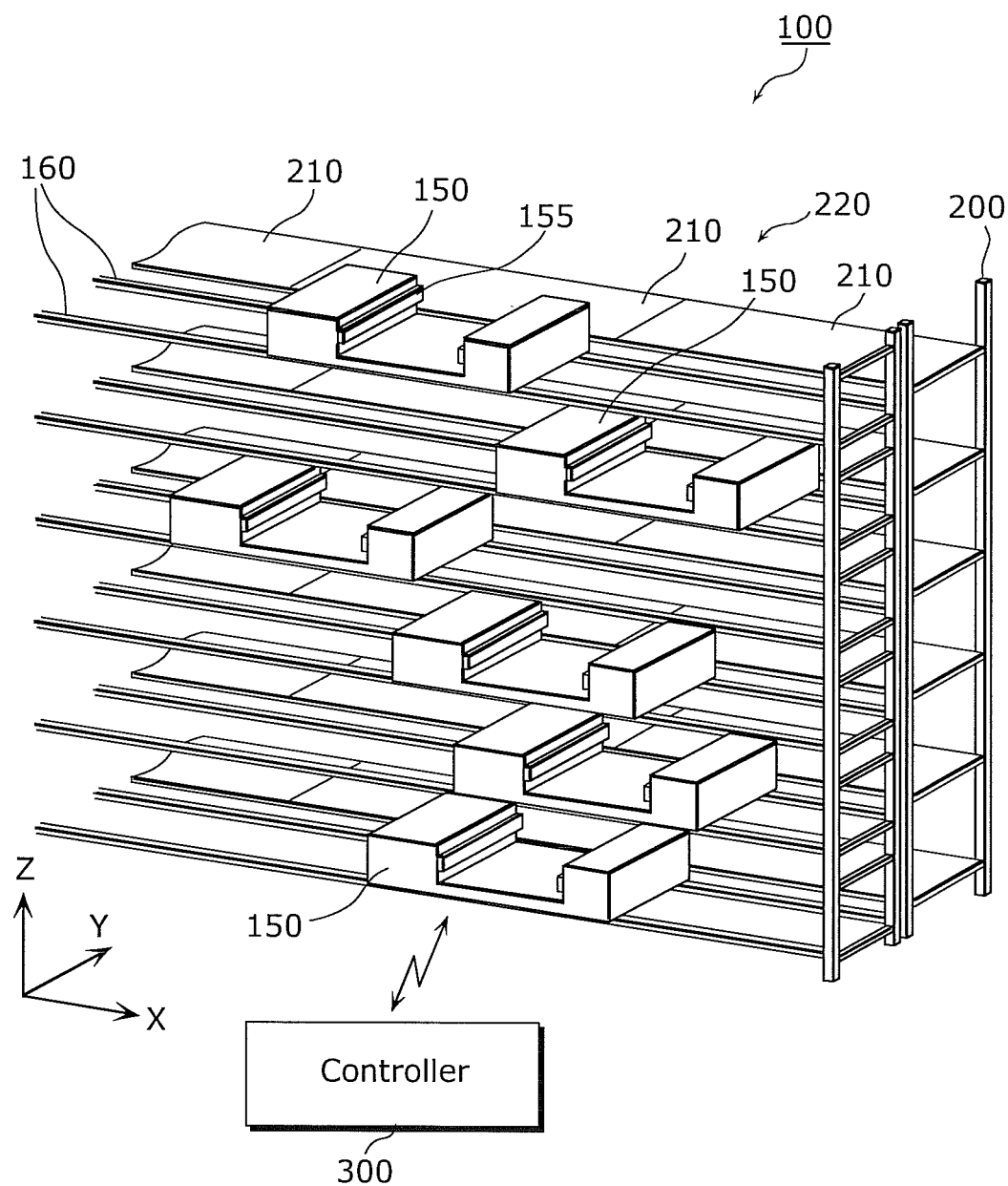
FIG. 2 is a perspective view showing a physical relationship between a rack and each of traveling vehicles in the automatic warehouse according to a preferred embodiment of the present invention.

FIG. 2 is a perspective view showing a physical relationship between a rack and each of traveling vehicles in the automatic warehouse according to a preferred embodiment of the present invention. It is noted that, in FIG. 2, other constituent features, such as elevators, are omitted for clarifying the physical relationship between the rack and each of the traveling vehicles.

Figure 3:
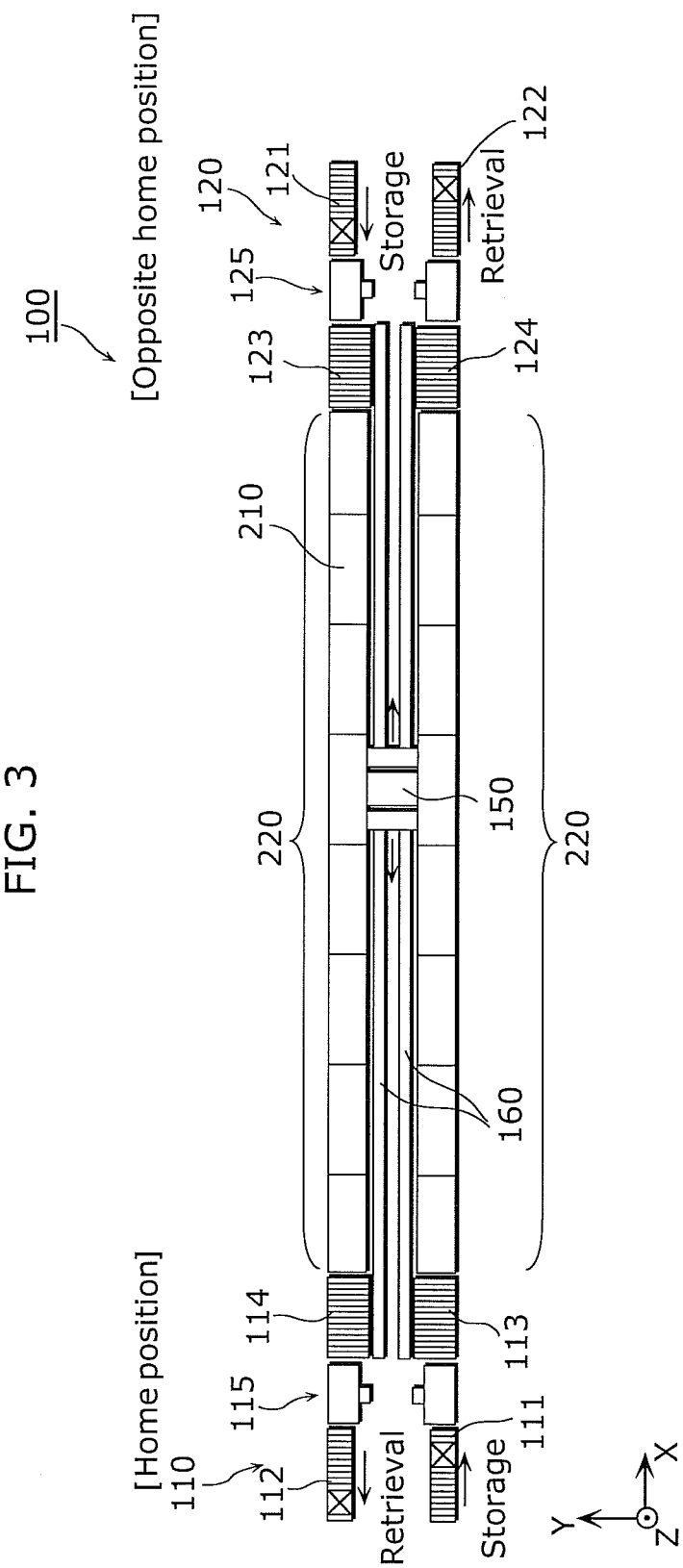
FIG. 3 is a plan view showing a schematic structure of the automatic warehouse according to a preferred embodiment of the present invention.

FIG. 3 is a plan view showing a schematic structure of the automatic warehouse according to a preferred embodiment of the present invention.

The drawings show that an automatic warehouse 100 according to preferred embodiment of the present invention preferably includes a rack 200 and traveling vehicles 150.

The rack 200 includes shelves 220 vertically (in the Z-axis direction) arranged. Each of the shelves 220 has a row of trays 210 horizontally (in the X-axis direction) arranged.

Each of the trays 210 may be individually formed, or the trays 210 are formed into one piece. In other words, a shelf board of the shelf 220 is compartmentalized, so that each of the shelves 220 may have two or more trays 210.

Moreover, each of the traveling vehicles 150 can independently travel in a horizontal direction along a traveling path 160 having a pair of rails, and can load and unload articles to and from the rack 200. Furthermore, each of the traveling vehicles 150 is provided to a corresponding one of the shelves 220. In other words, the traveling vehicles 150 correspond to the shelves 220 on one-on-one basis.

Here each of the traveling vehicles 150 according to a preferred embodiment includes a transfer device 155, as shown in FIG. 2. The transfer device 155 preferably includes a mechanism which allows the device to be extendible in, for example, a longitudinal direction (the Y-axis direction) for loading and unloading articles.

The transfer device 155 may be extendible in both of front and back directions in the longitudinal direction. Hence, as shown in FIG. 3, two of the racks 200 may be placed across the traveling path 160 of the traveling vehicle 150 from each other, which is omitted in FIGS. 1 and 2.

In addition, the automatic warehouse 100 includes a first station 110 and a second station 120. The stations are horizontally spaced with each other. Specifically, the first station 110 is located at the home position (on the left of FIG. 1) of the rack 200, and the second station 120 is located at the opposite home position (on the right of FIG. 1).

Each of the first station 110 and the second station 120 is placed at a vertically different position. Specifically, the first station 110 is placed at a vertical position corresponding to a vertical position of a bottom shelf among the shelves 220. The second station 120 is placed at a vertical position corresponding to a vertical position of a top shelf among the shelves 220.

Each of the first station 110 and the second station 120 receives articles to be stored on and unloaded from the rack 200. In other words, the articles are transported to and from the rack 200 via each of the first station 110 and the second station 120.

Moreover, the automatic warehouse 100 includes a first elevator 115 and a second elevator 125 both capable of moving articles up and down. Provided for the first station 110, the first elevator 115 mediates the traffic of the articles between the first station 110 and at least one of the traveling vehicles 150. Provided for the second station 120, the second elevator 125 mediates the traffic of the articles between the second station 120 and at least one of the traveling vehicles 150.

The automatic warehouse 100 includes a controller 300 to control operations of the traveling vehicles 150. The traveling vehicles 150 are operated with control signals transmitted from the controller 300 through wireless or wired communications.

The controller 300 includes a shelf assigning unit to be described later. The shelf assigning unit assigns, to each of first station 110 and the second station 120, one or more shelves 220 to be preferentially used thereby.

FIG. 3 briefly shows a basic operation of the automatic warehouse 100.

An article transported by a conveyer for storage 111 of the first station 110 is placed on a platform for storage 113 by the first elevator 115. The platform for storage 113 is positioned, corresponding to the level of the shelf 220 assigned to the first station 110.

The article placed on the platform for storage 113 is picked up by one of the traveling vehicles 150 for the assigned shelf 220, and placed on one of the trays 210 found on the shelf 220. This is how articles are stored via the first station 110.

There is an article placed on one of the trays 210 found on one of the shelves 220 assigned to the first station 110. The article is picked up by one of the traveling vehicles 150 for the assigned shelf 220, and transported to a platform for retrieval 114. The platform for retrieval 114 is positioned, corresponding to the level of the shelf 220. The article transported to the platform for retrieval 114 is moved to a conveyer for retrieval 112 via the first elevator 115, and further transported to a destination where the conveyer for retrieval 112 leads to.

This is how articles are retrieved via the first station 110.

Similar to the first station 110, the second station 120 includes a conveyer for storage 121 and a conveyer for retrieval 122. The second elevator 125, a platform for storage 123, and a platform for retrieval 124 also carry out storage and retrieval operations via the second station 120.

Moreover, the storage and retrieval operations via one of the first station 110 and the second station 120 can be carried out independently from the storage and retrieval operations via the other one.

Figure 4:
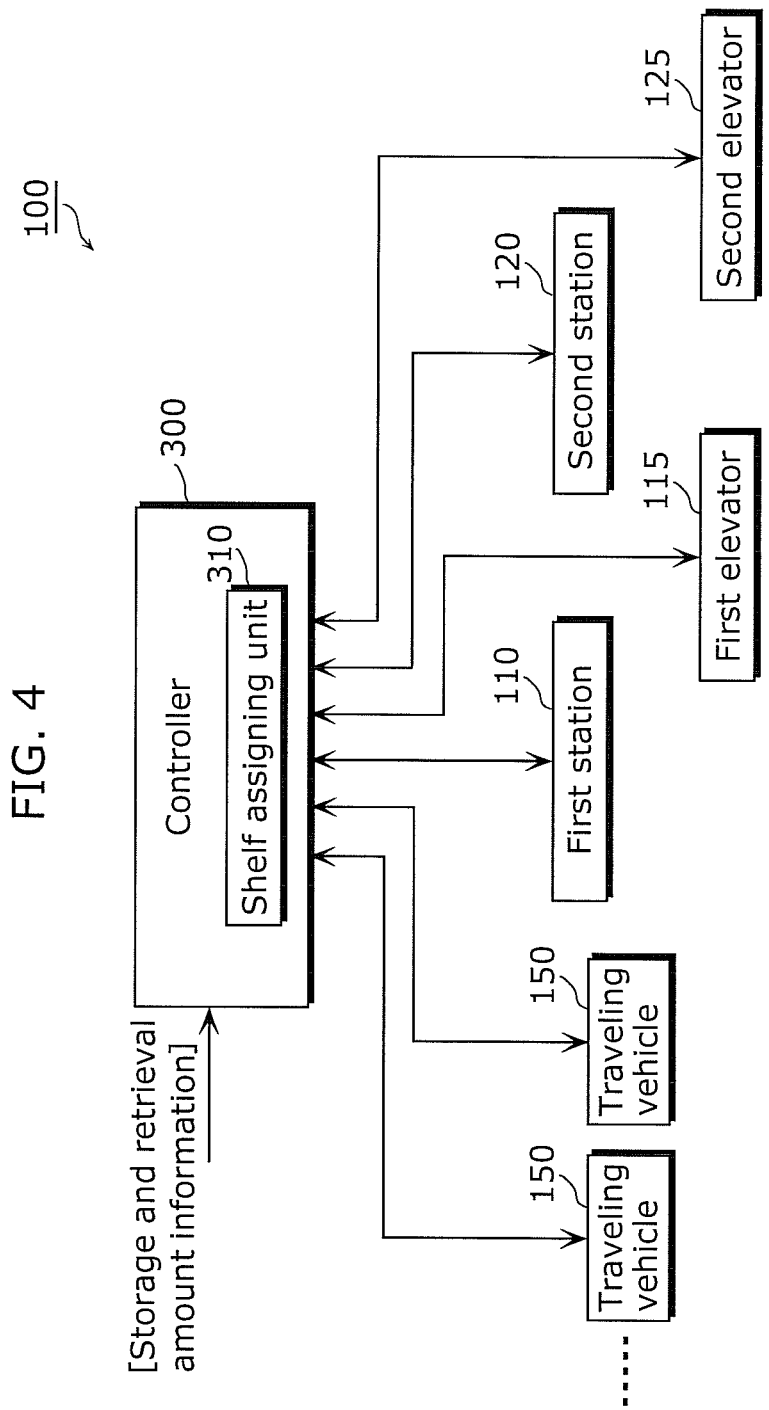
FIG. 4 is a block diagram showing a control system of the automatic warehouse according to a preferred embodiment of the present invention.

FIG. 4 is a block diagram showing a control system of the automatic warehouse 100 according to a preferred embodiment of the present invention.

As shown in FIG. 4, the controller 300 includes a shelf assigning unit 310. From among the shelves 220 which the rack 200 has, the shelf assigning unit 310 assigns, to each of the stations (the first station 110 and the second station 120 in the present preferred embodiment), one or more of the shelves 220 to which the station has priority of use over the rest of the stations.

According to the assigning determined by the shelf assigning unit 310, the controller 300 controls operations of each of the constituent features. For example, the controller 300 controls the traveling vehicle 150 which works with the first station 110, the first elevator 115, a corresponding one of the shelves 220, so that the article brought to the first station 110 is to be stored on the shelf 220 assigned to the first station 110.

Furthermore, in the present preferred embodiment, the shelf assigning unit 310 obtains storage and retrieval amount information. The information shows the storage and retrieval amount of articles transported in and out of the rack 200 via each of the first station 110 and the second station 120.

For example, the shelf assigning unit 310 obtains the storage and retrieval amount information at a certain point. The storage and retrieval amount information shows (i) the amount of articles to be stored (the articles outside the rack 200 are stored on the rack 200) via the first station 110 after the certain point, and (ii) the amount of articles to be retrieved (the articles stored on the rack 200 are transported out of the rack 200) via the first station 110 after the certain point.

For the second station 120, as well, the shelf assigning unit 310 obtains the storage and retrieval amount information showing the amount of the articles to be stored and retrieved via the second station 120.

It is noted that, upon receiving the storage and retrieval amounts to be entered by the user, the shelf assigning unit 310, for example, obtains the storage and retrieval amount information on the first station 110 and the second station 120.

In addition, the shelf assigning unit 310 can also obtain the storage and retrieval amount information on the first station 110 and the second station 120 through communications with a server device which manages information on articles to be stored on and picked up from the rack 200.

The shelf assigning unit 310 compares the storage and retrieval amount of the first station 110 with that of the second station 120, both shown in the obtained storage and retrieval amount information. Based on the comparison result, the shelf assigning unit 310 further determines the assigning of the shelves 220 to each of the first station 110 and the second station 120.

It is noted that the controller 300 is preferably implemented in a form of an interface executing input and output of information, and a computer including a Central Processing Unit (CPU) executing a control program and a memory, for example.

Moreover, the shelf assigning unit 310 is not necessarily included in the controller 300. For example, the shelf assigning unit 310 may be implemented in a form of a computer other than the controller 300, for example.

As described above, the automatic warehouse 100 according to a preferred embodiment of the present invention includes stations to store and retrieve articles, and causes the shelf assigning unit 310 to assign one or more of the shelves 220 for each station.

Exemplified hereinafter is how the shelves 220 are assigned by the shelf assigning unit 310 with reference to FIGS. 5 to 9.

Figure 5:
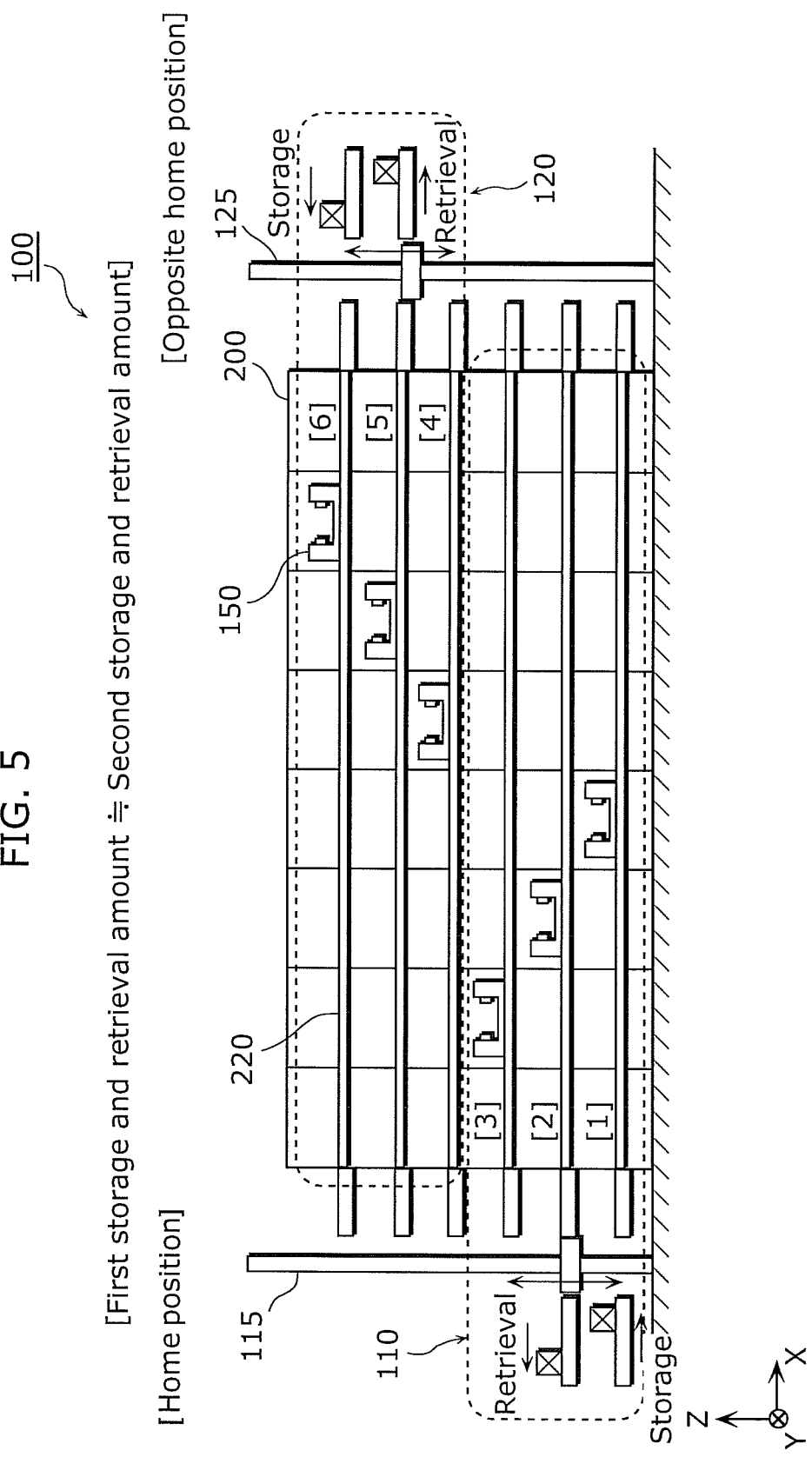
FIG. 5 is a first example of assigning shelves by a shelf assigning unit according to a preferred embodiment of the present invention.

FIG. 5 is a first example of assigning the shelves 220 by the shelf assigning unit 310 according to a preferred embodiment of the present invention.

The shelf assigning unit 310 obtains first storage and retrieval amount information and second storage and retrieval amount information. The first storage and retrieval amount information shows a storage and retrieval amount (a first storage and retrieval amount) of the articles which travel via the first station 110. The second storage and retrieval amount information shows a storage and retrieval amount (a second storage and retrieval amount) of the articles which travel via the second station 120.

The shelf assigning unit 310 further compares the first storage and retrieval amount with second storage and retrieval amount, and determines, for example, whether or not the absolute value of the difference between the amounts is equal to a predetermined threshold value or smaller. This determines whether or not the first storage and retrieval amount is approximately the same (including completely the same) as the second storage and retrieval amount.

In the case where the absolute value of the difference is equal to or smaller than the predetermined threshold value; that is where the first storage and retrieval amount is approximately the same as the second storage and retrieval amount, the shelf assigning unit 310 assigns the same number, or almost the same number, of the shelves 220 to each of the first station 110 and the second station 120.

For example, assume the case where the rack 200 includes six of the shelves 220; namely shelves [1] to [6], as shown in FIG. 5.

Here the shelf assigning unit 310 assigns three of the shelves 220 to each of the first station 110 and the second station 120.

When assigning some of the shelves 220 to at least one of the first station 110 and the second station 120, the shelf assigning unit 310 assigns, to the at least one of the first station 110 and the second station 120, the some shelves 220 which are vertically consecutive.

Furthermore, the shelf assigning unit 310 assigns the some shelves 220, so that the vertical position of any one of the some shelves 220 corresponds to a vertical position of the station to which the some shelves 200 are assigned.

For example, in the case where there are three of the shelves 220 assigned to the first station 110 as shown in FIG. 5, the shelf assigning unit 310 assigns the three shelves 220 so that the position of any one of the three shelves 220 consecutively arranged in vertical directions corresponds to the position of the first station 110 in vertical directions.

In other words, assigned to the first station 110 are the three of the consecutive shelves 220 in vertical directions, the three shelves which are relatively close to the first station 110.

In a similar manner, the shelf assigning unit 310 assigns, to the second station 120, the rest of the three shelves 220 relatively close to the second station 120.

As a result, FIG. 5 shows that shelves [1] to [3] are assigned to the first station 110, and shelves [4] to [6] are assigned to the second station 120.

In addition, when the absolute value of the above difference is greater than the predetermined threshold value, the shelf assigning unit 310 assigns more shelves 220 to the station handling a greater storage and retrieval amount than to the other station.

Figure 6:
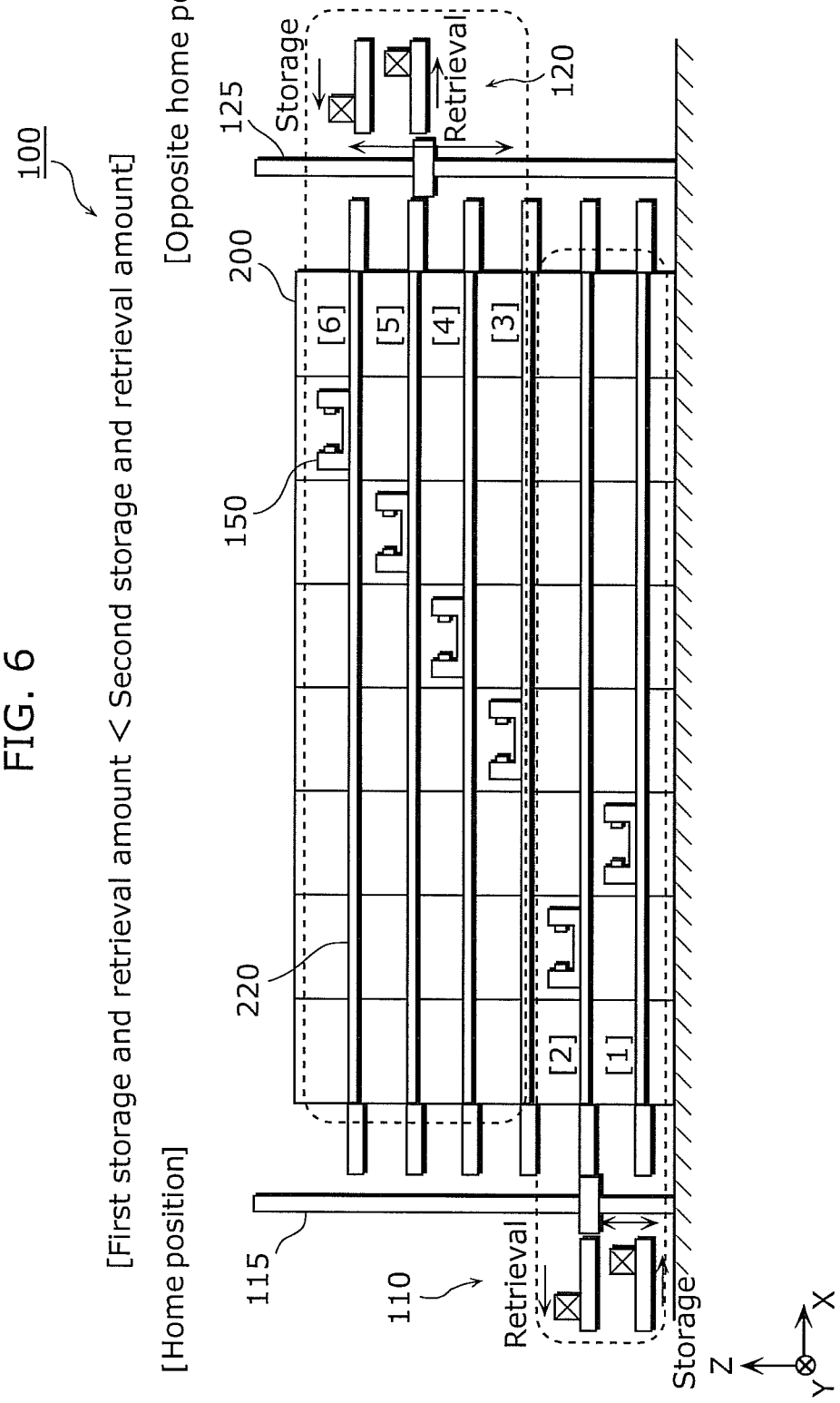
FIG. 6 is a second example of assigning the shelves by the shelf assigning unit according to a preferred embodiment of the present invention.

FIG. 6 is a second example of assigning the shelves 220 by the shelf assigning unit 310 according to a preferred embodiment of the present invention.

Figure 7:
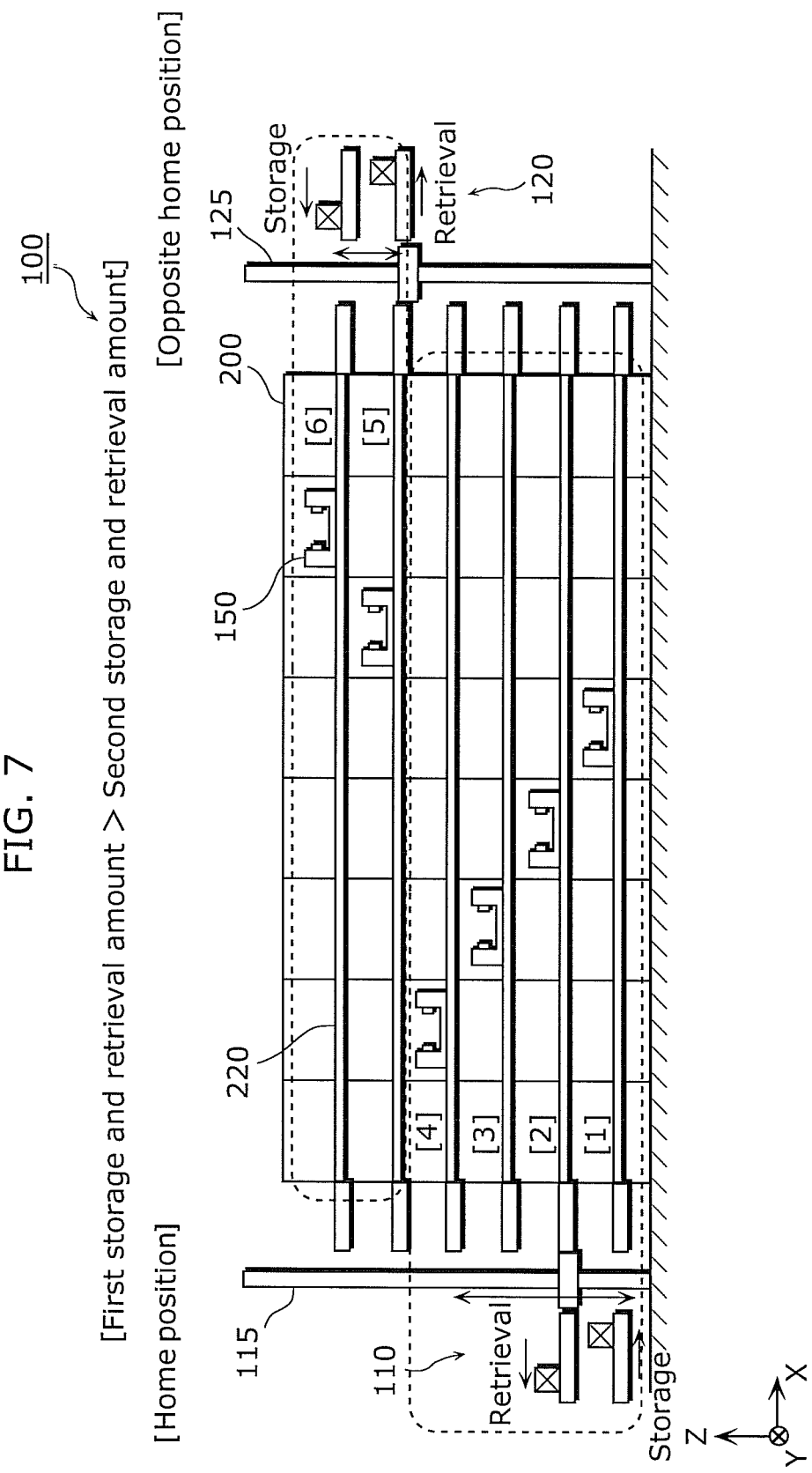
FIG. 7 is a third example of assigning the shelves by the shelf assigning unit according to a preferred embodiment of the present invention.

FIG. 7 is a third example of assigning the shelves 220 by the shelf assigning unit 310 according to a preferred embodiment of the present invention.

The shelf assigning unit 310 compares the first storage and retrieval amount with the second storage and retrieval amount. When the absolute value of the difference between the amounts is greater than a predetermined threshold value, the shelf assigning unit 310 checks to find out which is greater, the first storage and retrieval amount or the second storage and retrieval amount.

When the first storage and retrieval amount is greater than the second storage and retrieval amount as the result of the check, the shelf assigning unit 310 assigns each of the first station 110 and the second station 120 to one or more of the shelves 220 so that the second station 120 has more shelves 220 assigned to than the first station 110.

As a result, in FIG. 6, two of the shelves 220 (the shelves [1] and [2]) are virtually and consecutively assigned on the side of the first station 110.

The second station 120 four of the shelves 220 (the shelves [3] to [6]) are virtually and consecutively assigned on the side of the first station 120.

When (i) the absolute value of the difference between the first storage and retrieval amount and the second storage and retrieval amount is greater than the predetermined threshold value and (ii) the first storage and retrieval amount is greater than the second storage and retrieval amount, more shelves 220 are assigned to the first station 110 than to the second station 120.

As a result, in FIG. 7, four of the shelves 220 (the shelves [1] to [4]) are virtually and consecutively assigned on the side of the first station 110.

Furthermore, two of the shelves 220 (the shelves [5] and [6]) are virtually and consecutively assigned on the side of the second station 120.

As described above, the automatic warehouse 100 according to a preferred embodiment of the present invention uses the shelf assigning unit 310 to assign one or more of the shelves 220 to each of the stations. In other words, each station has the storage spaces on the rack 200 for each shelf 220 having a row of horizontally arranged trays 210.

Specifically, each of the traveling vehicles 150 has the same maximum traveling distance in horizontal directions no matter to which station the shelf 220 for the traveling vehicle 150 is assigned. In other words, the increase in the number of the shelves 220 assigned to one station does not cause the decrease in efficiency of the storage and decrease via the station.

Furthermore, it is assumed that the articles brought in via the first station 110 are placed on the shelf [1] assigned to the first station 110. Here the traveling vehicle 150 places the articles on the trays 210 of the shelf [1], beginning at the closest to the first station 110. Hence, the traveling vehicle 150 can place the articles on all the trays 210 found on the shelf [1]. In other words, the automatic warehouse 100 can be efficiently operated.

Moreover, each of the shelves 220 has one of the traveling vehicles 150. Thus operations for the placing and picking-up of the articles at one of the shelves 220 can be carried out independently from those at another one of the shelves 220.

Assumed here is the case where the shelf [2], assigned to the first station 110, has to receive the articles from the second station 120. Even in such a case, no matter where the other traveling vehicles 150 are positioned, the traveling vehicle 150 for the shelf [2] travels to the opposite home position where the second station 120 is placed, picks up the article, and puts the article on a vacant tray 210 found on the shelf [2].

In addition, when the shelves 220 are assigned to one of the stations, the shelves 220 are consecutively arranged in vertical directions. Thus, the automatic warehouse 100 can efficiently carry out the storage and retrieval operations of the articles for the shelves 220 via the station.

Furthermore, as shown in FIGS. 5 to 7, assigned to each of the stations are the shelves 220 placed at positions corresponding to the vertical positions of the stations.

For example, the shelves [1] to [3] are assigned to the first station 110 as shown in FIG. 5. Here the elevating platform of the first elevator 115 travels between the shelf [1] and the shelf [3].

The shelves [4] to [6] are assigned to the second station 120. Thus, the elevating platform of the second elevator 125 travels between the shelf [4] to the shelf [6].

In other words, when the automatic warehouse 100 causes each of the first elevator 115 and the second elevator 125 to carry out necessary operations, the total traveling distance of each of the first elevator 115 and the second elevator 125 for elevating an article is successfully minimized. Hence, these elevators can be efficiently operated.

Described hereinafter is an example of an efficient storage and retrieval operation by the automatic warehouse 100 according to the a preferred embodiment with reference to FIG. 8.

Figure 8:
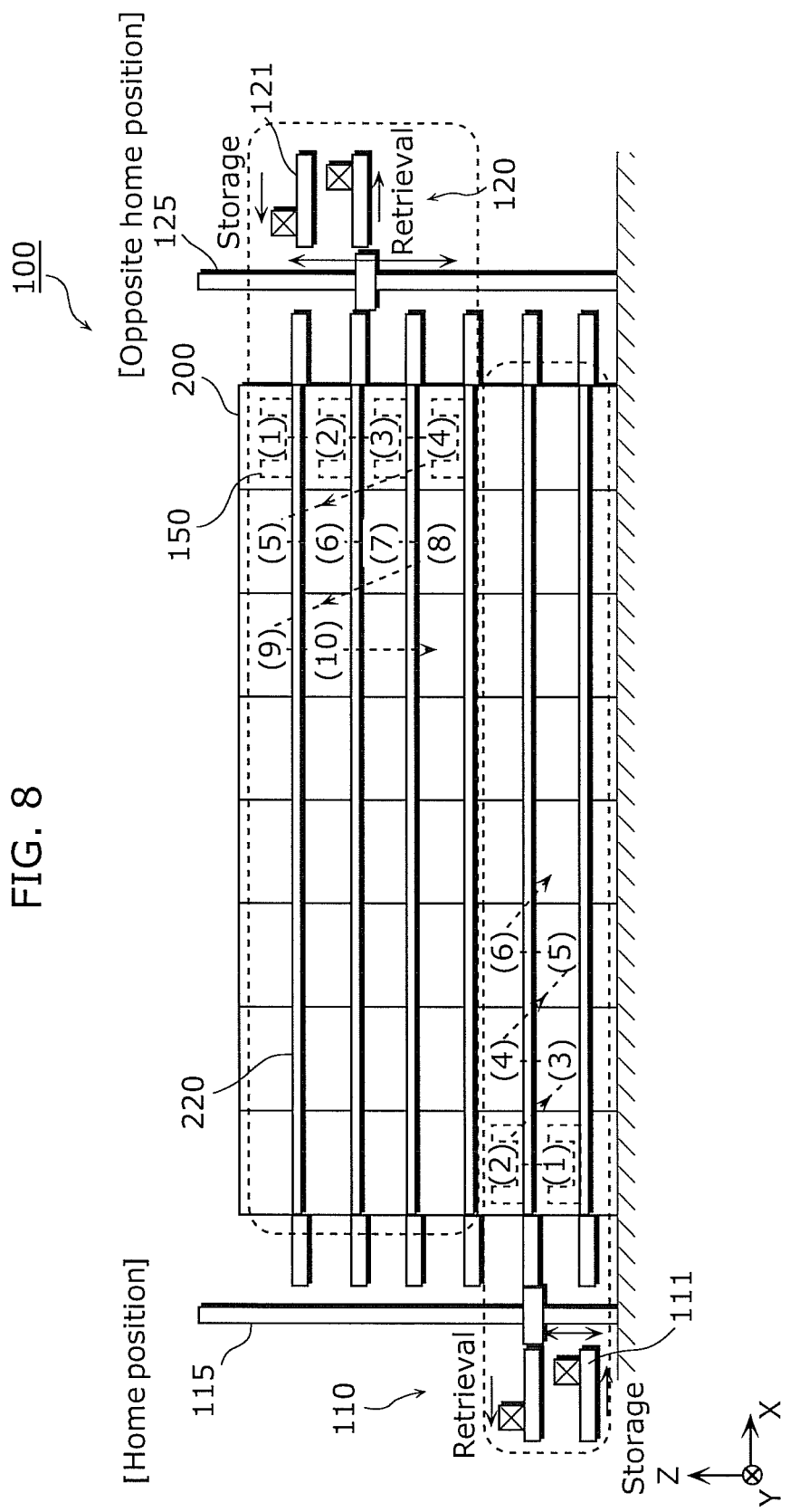
FIG. 8 exemplifies an efficient storage and retrieval operation by the automatic warehouse according to a preferred embodiment of the present invention.

FIG. 8 exemplifies an efficient storage and retrieval operation by the automatic warehouse 100 according to a preferred embodiment of the present invention.

Specifically, FIG. 8 shows a placement order of articles to be brought in the rack 200 via each of the first station 110 and the second station 120.

FIG. 8 further shows the following: the second storage and retrieval amount is greater than the first storage and retrieval amount, the shelves [1] and [2] are assigned to the first station 110, and shelves [3] to [6] are assigned to second station 120.

Here the articles brought from the first station 110 are placed, beginning at the tray 210 found (i) on the bottom row, (ii) closest to the home position, and (iii) nearest the conveyer for storage 111. Specifically, the articles are placed in the order of (1), (2), . . . (5), and (6) . . . .

In addition, the first elevator 115 moves only between the shelves [1] and [2].

The articles brought from the first station 120 are placed, beginning at the tray 210 found (i) nearest the conveyer for storage 121, (ii) on the top row, and (iii) closest to the opposite home position. Specifically, the articles are placed in the order of (1), (2), . . . (9), and (10) . . . .

In addition, the second elevator 125 moves only between the shelves [3] and [6].

As described above, the articles brought in from each of the first station 110 and the second station 120 are placed, beginning at the tray 210 which is closest to the entrance to the rack 200. Accordingly, an efficient storage operation is achieved in storing articles via each station.

Moreover, assumed is another case where not all the trays 210 on the shelves [1] and [2] are filled with articles even though all the articles to be brought in from the first station 110 are placed on the shelves [1] and [2].

Here trays 210 (vacant trays 210) with no articles placed or no articles are to be placed are found together closer to the opposite home position.

In other words, when articles, brought in from the second station 120 at the opposite home position, need to be placed on the vacant trays 210 found on the shelves [1] and [2], the vacant trays 210 are found together closer to the second station 120. Thus, the articles brought in from the second station 120 can be efficiently placed to the vacant trays 210.

The efficient placement of the articles is also achieved when the articles, brought in from the first station 110 at the home position, need to be placed on the vacant trays 210 found on shelves [3] to [6].

When the articles are retrieved via each of the first station 110 and the second station 120, the automatic warehouse 100 retrieves the articles, starting from the article on the tray 210 closest to each of the retrieval position.

Thus, when articles need to be retrieved from any one of shelves 220 assigned to the second station 120 via the first station 110, for example, highly likely to be retrieved are the articles on the trays 210 positioned relatively close to the first station 110.

In a preferred embodiment, each of the first station 110 and the second station 120 is stationary.

Thus, the shelf assigning unit 310 may previously assign (i) to the first station 110, one or more of the shelves 220 relatively close to the first station 110, and (ii) to the second station 120, one or more of the shelves 220 relatively close to the second station 120.

In other words, when assigning the shelves 220 to each station, the shelf assigning unit 310 may determine to which station the shelves 220 are to be assigned. Here the to-be-assigned shelves 200 are only the ones other than the already-assigned shelves 220 only.

Figure 9:
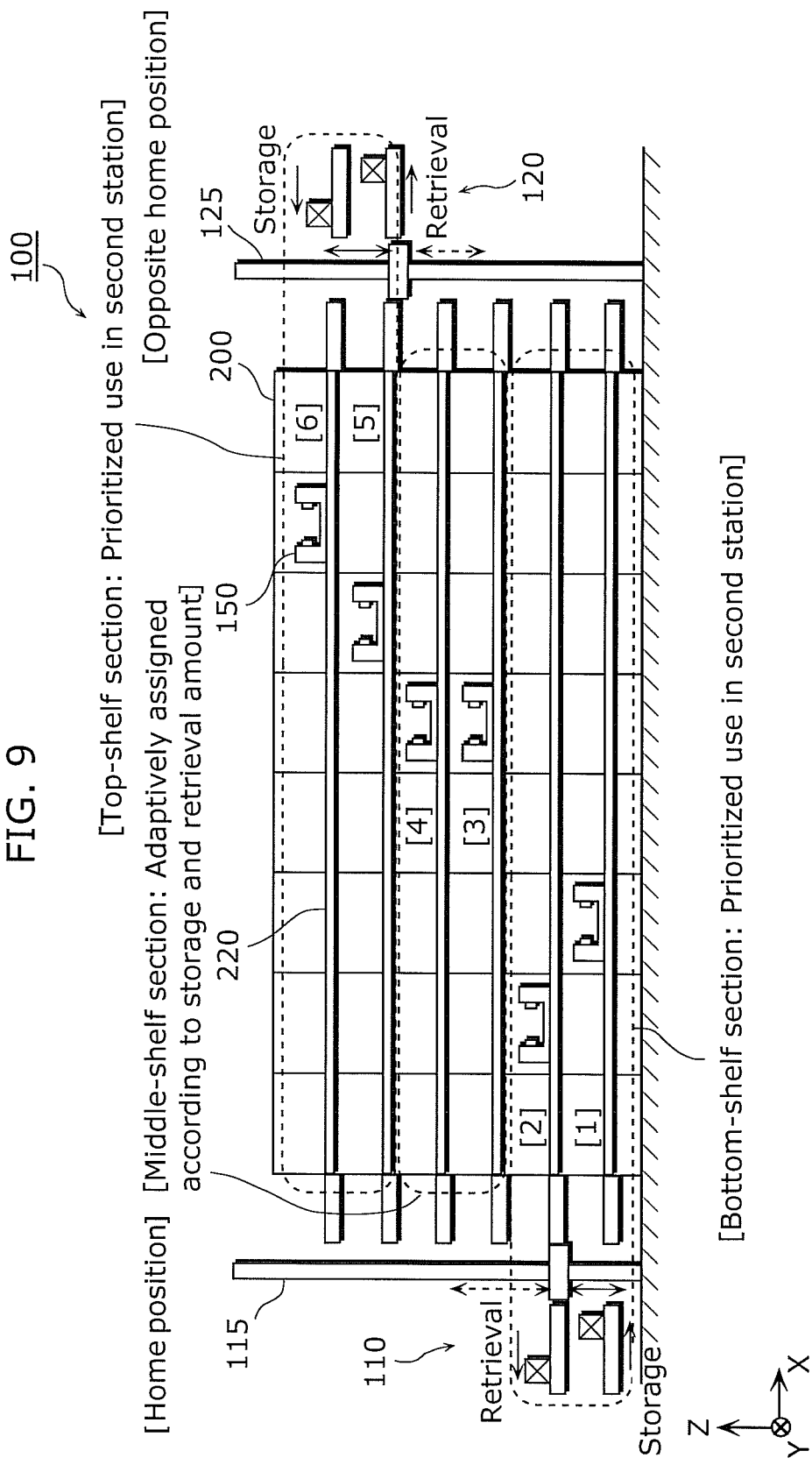
FIG. 9 is a fourth example of assigning the shelves by the shelf assigning unit according to a preferred embodiment of the present invention.

FIG. 9 is a fourth example of assigning the shelves 220 by the shelf assigning unit 310 according to a preferred embodiment of the present invention.

As shown in FIG. 9, for example, the shelves 220 on the rack 200 are classified into three sections; a top-shelf section (the shelves [3] and [4]), a middle-shelf section (the shelves [5] and [6]), and a bottom-shelf section (the shelves [1] and [2]).

Here the shelf assigning unit 310 has previously assigned (i) to the second station 120, the shelves [5] and [6] which belong to the top-shelf section, and (ii) to the first station 110, the shelves [1] and [2] which belong to the bottom-shelf section. In other words, the shelf assigning unit 310 creates hold information indicating a relationship between the stations and the shelves 220.

Then the shelf assigning unit 310 obtains the first storage and retrieval amount information and the second storage and retrieval amount information, and compares the first storage and retrieval amount with the second storage and retrieval amount each indicated in the information. Based on the comparison result, the shelf assigning unit 310 further determines how the shelves [3] and [4], belonging to the middle-shelf section, are assigned.

Specifically, when the comparison result shows that the first storage and retrieval amount are approximately the same as the second storage and retrieval amount, the shelf assigning unit 310 assigns the shelf [3] to the first station 110 and the shelf [4] to the second station 120, for example.

Here, as shown in the example in FIG. 5, the shelves [1] to [3] are assigned to the first station 110, and the shelves [4] to [6] are assigned to the second station 120.

In the case where the comparison result shows that the second storage and retrieval amount is greater than the first storage and retrieval amount, the shelf assigning unit 310 assigns, to the second station 120, both of the shelves [3] and [4] belonging to the middle-shelf section, for example.

Here, as shown in the example in FIG. 6, the shelves [1] and [2] are assigned to the first station 110, and the shelves [3] to [6] are assigned to the second station 120.

In the case where the comparison result shows that the first storage and retrieval amount is greater than the second storage and retrieval amount, the shelf assigning unit 310 assigns, to the first station 110, both of the shelves [3] and [4] belonging to the middle-shelf section, for example.

Here, as shown in the example in FIG. 7, the shelves [1] to [4] are assigned to the first station 110, and the shelves [5] and [6] are assigned to the second station 120.

It is noted that the number of the shelves 220 included in each of the top-shelf section, the middle-shelf section, and the bottom-shelf section, and the assigning process of the shelves 220 based on the comparison result between first storage and retrieval amount and the second storage and retrieval amount are examples. Thus, different numbers and assigning approaches may be used, for example.

For example, assumed here is the case where the shelf [6] belongs to the top-shelf section, the shelves [2] to [5] belong to the middle-shelf section, and the shelf [1] belongs to the bottom-shelf section.

Here, when the second storage and retrieval amount is greater than the first storage and retrieval amount, for example, the shelf assigning unit 310 may assign either (i) all the shelves [2] to [5] to the second station 120 or (ii) the shelves [3] to [5] to the second station 120 and the shelf [2] to the first station 110.

In other words, the shelf assigning unit 310 fixes one or more of the shelves 220, which belong to each of the top-shelf section and the bottom-shelf section, as the shelves 220 for a prioritized use in either the first station 110 or the second station 120. Furthermore, the shelf assigning unit 310 assigns one or more of the shelves 220, which belong to the middle-shelf section, to one of the first station 110 and the second station 120 handling a greater storage and retrieval amount.

As described above, the shelf assigning unit 310 may adaptively assign, to each of the stations, only some of the shelves 220 which the rack 200 has.

As a result, for example, the shelf assigning unit 310 can efficiently assign the shelves 220.

Moreover, the bottom-shelf section and the top-shelf section can be dedicated to the first station 110 and the second station 120, respectively. Hence, for example, the shape and structure of the shelves 220 for the bottom-shelf section and the top-shelf section can be optimized to suit the kinds and weights of the articles which each station handles.

Furthermore, when shelves 220 are assigned to one station as shown in FIG. 5, the shelves 220 are vertically and consecutively assigned in a preferred embodiment of the present invention.

However, the shelves do not necessarily have to be assigned in vertical directions when the shelves 220 are assigned to one station.

Figure 10:
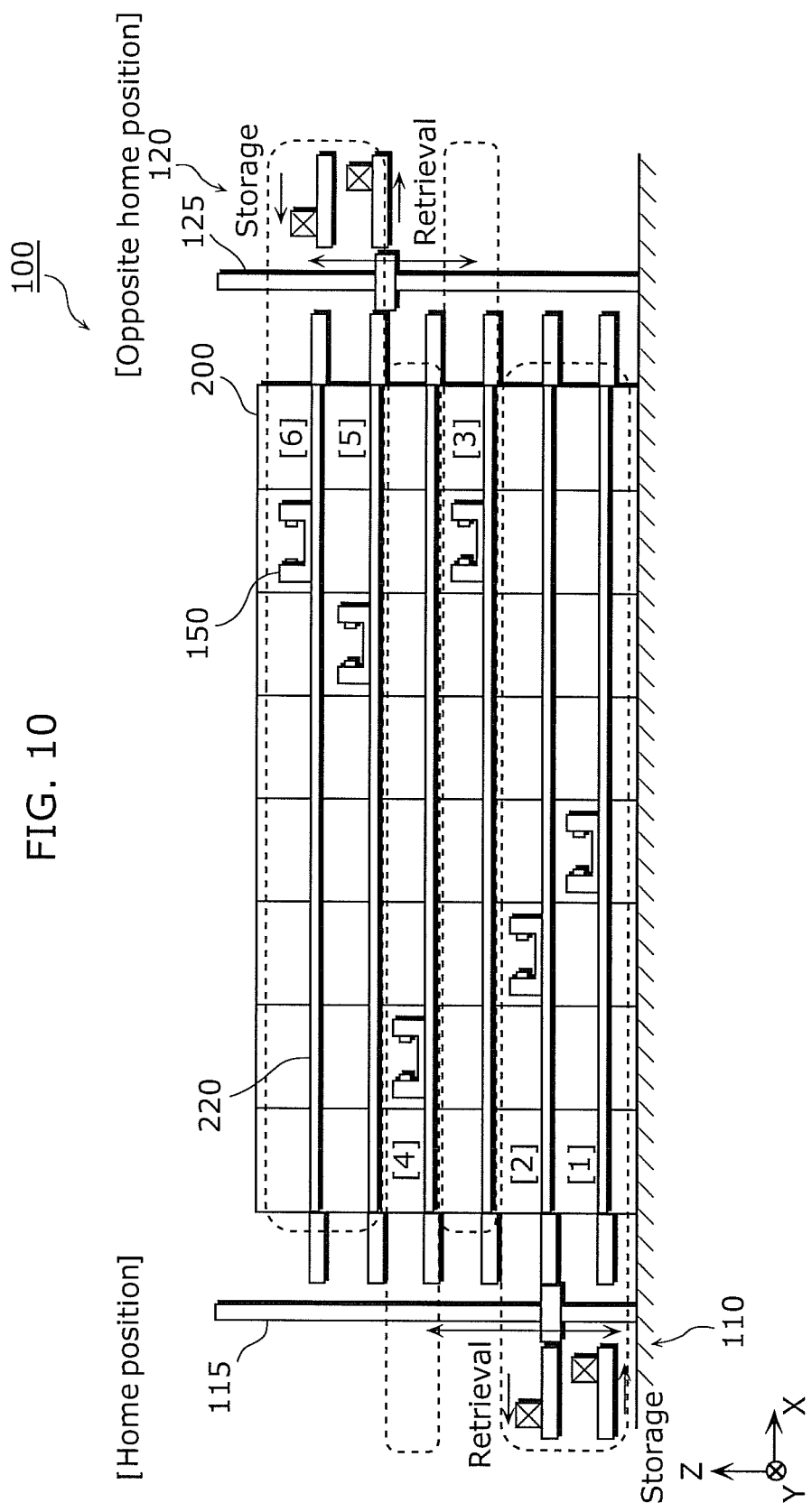
FIG. 10 is a fifth example of assigning the shelves by the shelf assigning unit according to a preferred embodiment of the present invention.

FIG. 10 is a fifth example of assigning the shelves 220 by the shelf assigning unit 310 according to a preferred embodiment of the present invention.

As shown in FIG. 10, for example, the shelf assigning unit 310 may assign the shelves [1], [2], and [4] to the first station 110, and the shelves [3], [5], and [6] to the second station 120.

Such assigning is effective when the shape or the structure of the shelf [3] is suitable to the articles to be brought in via the second station 120.

Moreover, when the shelves 220 are assigned to each station, the articles brought via the first station 110 are placed on the trays 210 of the shelves [1] and [2] in the order shown in FIG. 8. Then, beginning at the home position of the shelf [4], the articles are placed on the trays 210.

Accordingly, one or more of the vacant trays 210 can be found at the opposite home position of the shelf [4]. As a result, when the articles brought in from the second station 120 cannot fit on the shelves [3], [4], and [6], the automatic warehouse 100 can efficiently use the one or more of the vacant trays 210 found relatively close to the second station 120.

Similarly, the articles brought in from the second station 120 are placed on the trays 210 of the shelves [5] and [6]. Then, beginning at the opposite home position of the shelf [3], the articles are placed on the trays 210. Accordingly, one or more of the vacant trays 210 can be found relatively close to the first station 110.

Furthermore, the automatic warehouse 100 according to a preferred embodiment preferably includes two stations (the first station 110 and the second station 120), for example. Instead, the automatic warehouse 100 may have three or more of the stations.

Figure 11:
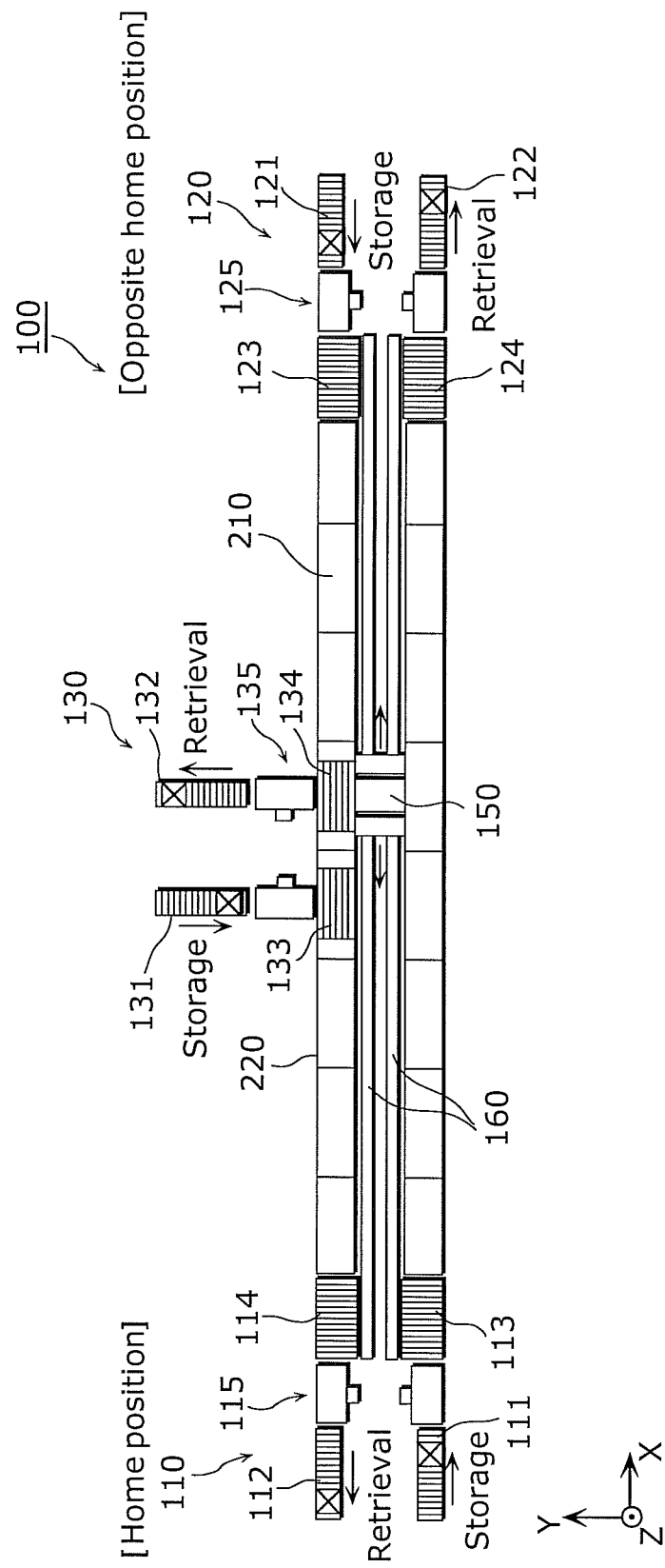
FIG. 11 is a plan view exemplifying a schematic structure of the automatic warehouse according to a preferred embodiment of the present invention when the automatic warehouse includes three stations.
Figure 12:
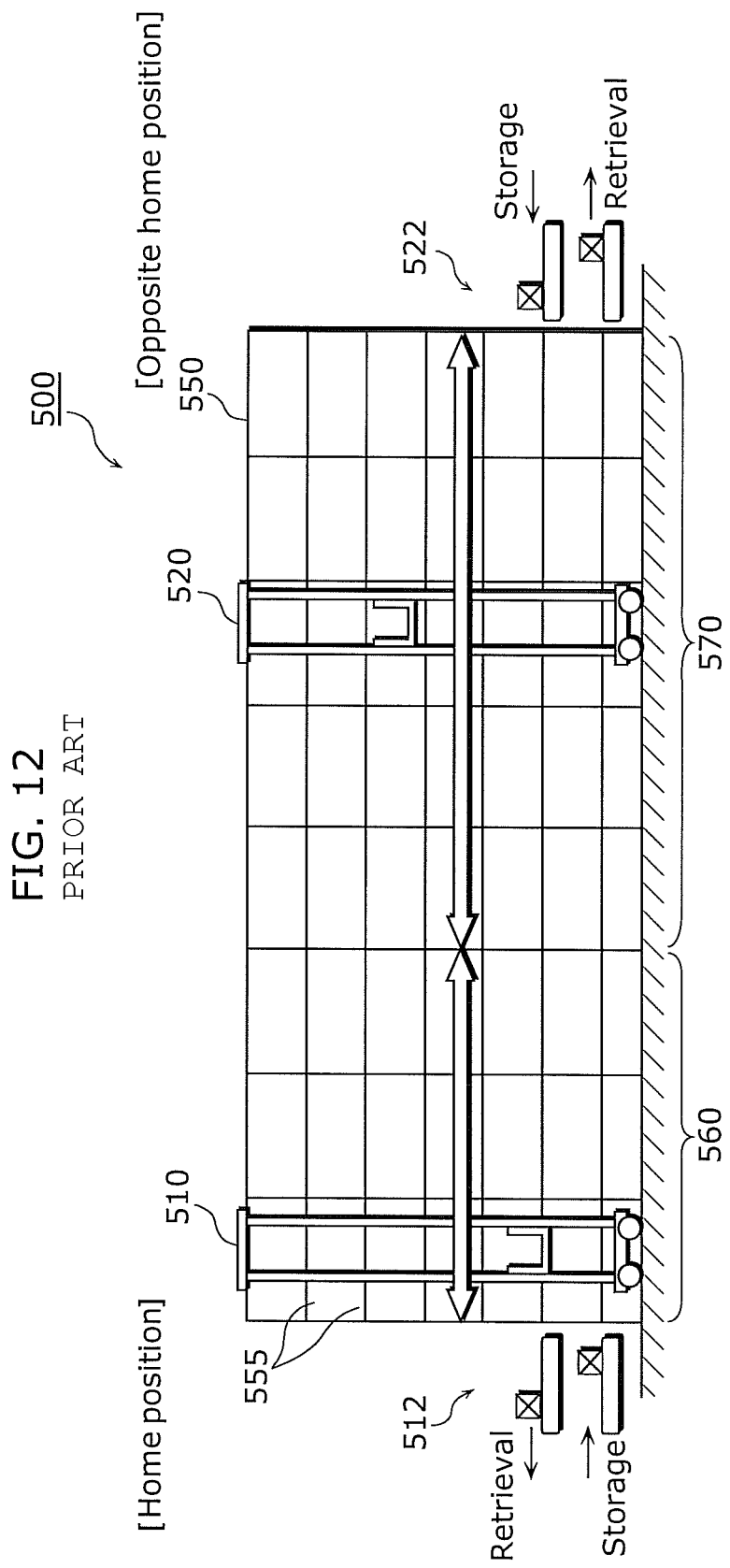
FIG. 12 exemplifies a technique to assign trays of a rack to two stations in a conventional automatic warehouse.

FIG. 11 is a plan view exemplifying a schematic structure of the automatic warehouse 100 according to a preferred embodiment of the present invention when the automatic warehouse 100 includes three stations, for example.

As shown in FIG. 11, the automatic warehouse 100 includes a third station 130 in the middle of the rack 200 with respect to a width direction. Moreover, the third station 130 includes a conveyer for storage 131 and a conveyer for retrieval 132.

Furthermore, a platform for storage 133 and a platform for retrieval 134 are positioned, corresponding to the level of each self 220 in the rack 200. The platform for storage 133 and the platform for retrieval 134 are used for storage and retrieval of the articles via the third station 130.

In addition, the automatic warehouse 100 includes a third elevator 135 for the third station 130. The use of the platform for storage 133, the platform for retrieval 134, and the third elevator 135 carryout storage and retrieval of articles via the third station 130.

It is noted that the third station 130 is vertically placed, for example, corresponding to the levels of shelves [3] and [4] (See FIG. 5, for example).

Here the shelf assigning unit 310, for example, assigns (i) the shelves [1] and [2] to the first station 110, (ii) the shelves [5] and [6] to the second station 120, and (iii) the shelves [3] and [4] to the third station 130.

In other words, the shelf assigning unit 310 assigns, to each of three stations, the virtually consecutive shelves 220 which are relatively closer to each station. Such assigning makes possible efficiently carrying out the operations for the storage and retrieval of the articles via the three stations.

Although exemplary preferred embodiments of this invention has been described in detail above, those skilled in the art will readily appreciate that many modifications are possible in the exemplary preferred embodiments without materially departing from the novel teachings and advantages of this invention. Accordingly, all such modifications are intended to be included within the scope of this invention.

Various preferred embodiments of the present invention provide automatic warehouses including stations for storage and retrieval of articles, and control methods thereof. In particular, preferred embodiments of the present invention provide an automatic warehouse which is capable of efficient operations for storage and retrieval of articles via each of the stations, and a control method thereof. Hence, preferred embodiments of the present invention are effective for use in an automatic warehouse storing articles for a factory and shipping storage.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automatic warehouse comprising:
a rack including shelves each including trays;
traveling vehicles each of which is provided to a corresponding one of the shelves, and independently travels in a horizontal direction to load and unload articles to and from the rack, the shelves being vertically arranged, the trays being horizontally arranged;
stations which are horizontally spaced from each other, and receive an article to be stored on and an article unloaded from the rack;
elevators each of which elevates the articles, belongs to a corresponding one of the stations, and mediates traffic of articles between the corresponding station and at least one of the traveling vehicles; and
a shelf assigning unit configured to assign, to each of the stations, one or more of the shelves to which the station has priority of use over the rest of the stations; wherein
when assigning some of the shelves to any one of the stations, the shelf assigning unit is configured to assign the some shelves which are vertically consecutive; and
each of the stations is placed at a vertically different position, and when assigning the some shelves to any one of the stations, the shelf assigning unit is configured to assign the some of the shelves so that a vertical position of any one of the some of the shelves corresponds to a vertical position of the one of the stations.

2. An automatic warehouse comprising:
a rack including shelves each including trays;
traveling vehicles each of which is provided to a corresponding one of the shelves, and independently travels in a horizontal direction to load and unload articles to and from the rack, the shelves being vertically arranged, the trays being horizontally arranged;
stations which are horizontally spaced from each other, and receive an article to be stored on and an article unloaded from the rack;
elevators each of which elevates the articles, belongs to a corresponding one of the stations, and mediates traffic of articles between the corresponding station and at least one of the traveling vehicles; and
a shelf assigning unit configured to assign, to each of the stations, one or more of the shelves to which the station has priority of use over the rest of the stations; wherein
when assigning some of the shelves to any one of the stations, the shelf assigning unit is configured to assign the some shelves which are vertically consecutive; and
the stations include a first station and a second station, the first station is placed at a vertical position corresponding to a vertical position of a bottom shelf among the shelves, the second station is placed at a vertical position corresponding to a vertical position of a top shelf among the shelves, and the shelf assigning unit is configured to (a) assign, to the first station, vertically consecutive shelves including the bottom shelf, and (b) assign, to second station, vertically consecutive shelves including the top shelf.

3. The automatic warehouse according to claim 2, wherein the stations include the first station and the second station, the shelves are classified into a top-shelf section, a middle-shelf section, and a bottom-shelf section, beginning at a top, one or more of the shelves which belong to the bottom-shelf section are assigned to the first station, and another one or more of the shelves which belong to the top-shelf section are assigned to the second station, and the shelf assigning unit is configured to (a) obtain storage and retrieval amount information indicating a storage and retrieval amount showing an amount of articles transported in and out of the rack via each of the first station and the second station, and (b) assign the one or more of the shelves, which belong to the middle-shelf section, to one of the first station and the second station handling a greater storage and retrieval amount.

4. An automatic warehouse comprising:
   a rack including shelves each including trays;
   traveling vehicles each of which is provided to a corresponding one of the shelves, and independently travels in a horizontal direction to load and unload articles to and from the rack, the shelves being vertically arranged, the trays being horizontally arranged;
   stations which are horizontally spaced from each other, and receive an article to be stored on and an article unloaded from the rack;
   elevators each of which elevates the articles, belongs to a corresponding one of the stations, and mediates traffic of articles between the corresponding station and at least one of the traveling vehicles; and
   a shelf assigning unit configured to assign, to each of the stations, one or more of the shelves to which the station has priority of use over the rest of the stations; wherein
   when assigning some of the shelves to any one of the stations, the shelf assigning unit is configured to assign the some shelves which are vertically consecutive; and
   the shelf assigning unit is configured to (a) obtain storage and retrieval amount information indicating a storage and retrieval amount showing an amount of articles transported in and out of the rack via each of at least two of the stations, and (b) assign one or more of the shelves to each of the two stations so that one of the two stations handling a greater storage and retrieval amount has more shelves assigned than the other station.

5. A method for controlling an automatic warehouse which includes a rack including shelves each including trays, the shelves being vertically arranged, the trays being horizontally arranged; traveling vehicles each of which is provided to a corresponding one of the shelves, and independently travels in a horizontal direction to load and unload articles to and from the rack; stations which are horizontally spaced with each other, and receive an article to be stored on and an article unloaded from the rack; and elevators each of which elevates the articles, belongs to a corresponding one of the stations, and mediates traffic of articles between the corresponding station and at least one of the traveling vehicles, the method comprising:
   selecting, for each of the stations, one or more of the shelves to which the station has priority of use over the rest of the stations;
   assigning, for each of the stations, the one or more of the shelves selected in the selecting step;
   transporting an article to one of the trays which are included in the one or more of the shelves assigned in the assigning step, using one of the traveling vehicles corresponding to the one of the trays, the article being received by any one of the stations and to be placed on the rack; and
   receiving, at any one of the stations, an article transported by the one of the traveling vehicles corresponding to one of the trays, the article being transported from the one of the trays, and the trays being included in the one or more shelves assigned in the assigning step; wherein
   in the assigning step, some of the shelves assigned to any one of the stations are vertically consecutive;
   each of the stations is placed at a vertically different position; and
   in the assigning step, the some of the shelves are assigned so that a vertical position of any one of the some of the shelves corresponds to a vertical position of the one of the stations.

* * * * *